US006988857B2

(12) United States Patent
Kroemmer et al.

(10) Patent No.: US 6,988,857 B2
(45) Date of Patent: Jan. 24, 2006

(54) METHOD AND DEVICE FOR MONITORING A MASS FLOW IN A PNEUMATIC PIPELINE

(75) Inventors: Yvan Kroemmer, Goetzingen (LU); Emile Breden, Godbrange (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 10/502,387

(22) PCT Filed: Jan. 23, 2003

(86) PCT No.: PCT/EP03/00661

§ 371 (c)(1),
(2), (4) Date: Jul. 23, 2004

(87) PCT Pub. No.: WO03/062757

PCT Pub. Date: Jul. 31, 2003

(65) Prior Publication Data

US 2005/0084340 A1    Apr. 21, 2005

(30) Foreign Application Priority Data

Jan. 23, 2002   (LU) ........................................ 90883

(51) Int. Cl.
*B65G 51/36*         (2006.01)
(52) U.S. Cl. ..................... 406/34; 406/19; 37/861.73; 37/861.23; 37/861.26
(58) Field of Classification Search .................. 406/19, 406/34; 37/861.73, 861.23, 861.25, 861.26, 37/861.74
See application file for complete search history.

(56) References Cited

U.S. PATENT DOCUMENTS

| | | | | | |
|---|---|---|---|---|---|
| 3,939,709 A | * | 2/1976 | Echtler | ..................... | 73/861.73 |
| 4,441,101 A | | 4/1984 | Robar | | |
| 4,924,710 A | * | 5/1990 | Inada et al. | ............... | 73/861.23 |
| 5,048,761 A | * | 9/1991 | Kim | ........................... | 241/19 |

(Continued)

FOREIGN PATENT DOCUMENTS

CZ          9302235          7/1995

OTHER PUBLICATIONS

Benes P et al: "New design of the two-phase flowmeters" Sensors and Actuators A, Elsevier Sequoia S.A., Lausanne, CH, vol. 86, No. 3, Nov. 15, 2000 (2000-4141-4105), pp. 220-2205. XP00422455 ISSN: 0924-4247. p. 223. paragraph 3.3 -p.224. paragraph 4.

*Primary Examiner*—Joe Dillon, Jr.
(74) *Attorney, Agent, or Firm*—McCormick, Paulding & Huber LLP

(57) ABSTRACT

A device for monitoring the mass flow of a particulate solids flow in a pneumatic pipeline includes a measuring chamber and an impact body. Through an inlet connection the particulate solids flow is blown as a compact solid/gas jet onto the impact body, so as to impact thereon with substantially its whole cross-section. An acoustic transducer is associated with the impact body for sensing structure-born acoustic waves, which are generated by the compact solid/gas jet impacting onto the impact body, and transforming them into an output signal. Signal processing process the output signal so as to derive a value that is representative of the mass flow rate of the particulate solids flow.

14 Claims, 1 Drawing Sheet

U.S. PATENT DOCUMENTS 5,257,530 A * 11/1993 Beattie et al. .............. 73/61.75
5,503,035 A * 4/1996 Itoh et al. ................. 73/861.23
5,747,701 A * 5/1998 Marsh et al. ............ 73/861.23
6,253,625 B1 * 7/2001 Samuelson et al. ...... 73/861.71
6,644,132 B1 * 11/2003 Baumoel ................. 73/861.72
6,912,918 B1 * 7/2005 Lynnworth et al. ...... 73/861.26

* cited by examiner

US 6,988,857 B2

METHOD AND DEVICE FOR MONITORING A MASS FLOW IN A PNEUMATIC PIPELINE

CROSS-REFERENCE TO RELATED APPLICATIONS

This application is entitled to the benefit of and incorporates by reference in their entireties essential subject matter disclosed in International Application No. PCT/EP03/00661 filed on Jan. 23, 2003, and Luxembourg Patent Application No. 90 883 filed on Jan. 23, 2002.

FIELD OF THE INVENTION

The present invention relates to a method and device for monitoring a mass flow in a pneumatic pipeline.

BACKGROUND OF THE INVENTION

Pneumatic pipelines convey particulate solids, as e.g. pulverized or granular materials, using a gaseous fluid, usually air or an inert gas, as carrier medium. As pneumatic pipelines are becoming widespread in many areas of industry, there is an urgent need for simple and reliable methods and devices for monitoring a flow of particulate solids in a pneumatic pipeline and, more particularly, for monitoring the mass flow rate thereof. Being capable of continuously monitoring the mass flow rate in pneumatic pipelines allows for example: (i) to warrant an accurate delivery of particulate solids, thereby allowing to optimize a process and/or achieve a better product quality; (ii) to adjust optimum conveying conditions, thereby optimizing energy consumption and wear in the pneumatic conveying system; and (iii) to balance flow rates between multiple pipelines in complex pneumatic conveying systems.

Over the past three decades many different methods and devices have been developed for continuously monitoring the mass flow rate in a two phase solid/gas flow, including: mechanical, electrostatic, microwave, optical and acoustic methods. None of these methods is however a satisfactory solution for monitoring a flow of particulate solids in a pneumatic pipeline.

Mechanical methods use mechanical flow meters, such as: impact plates, multi-bladed rotors, Coriolis wheels, pressure drop measurement devices, as e.g. orifice plates and Venturi tubes. However, such mechanical flowmeters are generally unsuitable for monitoring the flow rate in pneumatic pipelines, because they are too sensitive to abrasion and present a risk of pipeline blockage.

Electrostatic flowmeters sense the electrostatic charge carried by the moving particles in pneumatic pipelines. A variety of factors, such as physical and chemical properties, humidity and velocity of the solid/gas flow, as well as con figuration, material and wall roughness of the pipeline can influence their measures. Attempts have been made to improve accuracy by charging up the transported solid via an external electric source. However, this approach is considered unsuitable in many cases due to the risk of particulate explosion.

Microwave flowmeters generate electromagnetic waves in the GHz frequency range and measure how these electromagnetic waves are affected by the particulate solid flow in the pneumatic pipeline. A problem with the microwave flowmeters is that the electromagnetic field is generally not homogeneous over the whole cross section of the pipeline. The measurements may therefore be falsified by inhomogeneous flow regimes such as roping. Furthermore, microwave flowmeters are very sensitive to physical and chemical properties of the transported solids, and their measures are easily falsified by small depositions of solids.

Optical methods are base on light attenuation or scattering by the particulate solids flow. They are only applicable to gas/solids flows where solids concentration is very low and are therefore generally unsuitable for pneumatic pipelines.

Acoustic methods can be divided into active and passive acoustic methods. Active acoustic methods measure the attenuation of an incident ultrasonic beam by the solid particles conveyed in the pipeline. A problem with the active acoustic methods is that they do not provide a homogeneous coverage of the whole cross section of the pipeline and that their measurements are therefore falsified by inhomogeneous flow regimes such as roping. Passive acoustic methods monitor the structure-borne acoustic waves generated by moving particles impacting upon or sliding along the pipe walls. The structure-borne acoustic waves are detected by microphones or piezoelectric sensors, which are strapped to the outer surface of the pipeline. Best results are obtained if the acoustic sensors are mounted on the extrados surface of a bend in the pipeline. Usually a high frequency range is monitored to counteract the effects of mechanical noises conducted along the pipe. These passive acoustic methods are falsified by inhomogeneous flow regimes and by structure-borne acoustic noise generated along the pneumatic pipeline.

In "New design of the two-phase flow meters" published in 2000 in "SENSORS AND ACTUATORS, A" vol. 86, N°3, pages 220–225, (publisher ELSEVIER SEQUOIA), P. BENES and K. ZEHNULA describe a method of measurement of small flow of two-phase media, where solid particles are carried by a carrying gas (air). The method is based on the principle that the solid particles carried by the flowing air generate an acoustic pressure wave when they impact onto a properly formed obstacle. The authors teach that the magnitude of the acoustic emission is proportional to the (average) mass of particles having a constant velocity. They suggest to use the method in two application areas: (1) mass flow or flow velocity measurement in different manufacturing areas, and (2) air dust measurement. In the first case, they use a rod that is inserted in the flow channel perpendicularly to the direction of flow and attach the sensor to this rod, so that the rod is used as a wave guide. It will be appreciated that this measuring method is not very reliable in case of inhomogeneous flow regimes in a pneumatic pipeline. In the second case (i.e. the air dust measurement), they concentrate the air flow directly on a piezoelectric sensor. Such a solution is of course only applicable to very low solid particles concentrations and certainly not to a particulate solids flow in a pneumatic pipeline.

OBJECT OF THE INVENTION

The technical problem underlying the present invention is to provide a simple, but reliable method and device for monitoring a particulate solids flow in a pneumatic pipeline.

SUMMARY OF THE INVENTION

The method in accordance with the present invention can be generally qualified as a passive acoustic method. In contrast to known passive acoustic methods, the method does not sense structure-born acoustic waves directly produced by the particulate solids flow. In accordance with the invention, the particulate solids flow is first transformed into a free and compact solid/gas jet. This free and compact solid/gas jet is then intercepted by a stemlike impact body that is axially arranged in said compact solid/gas jet, so that the latter impacts onto a frontal impact surface (50, 50') of this impact body with substantially its whole cross-section. The compact solid/gas jet impacting onto the stemlike impact body generates structure-born acoustic waves in the impact body, which are sensed to monitor the mass flow of the particulate solids flow in the pneumatic pipeline. It will be appreciated that this method is much less falsified by inhomogeneous flow regimes in the pneumatic pipeline and by structure-borne acoustic noise generated along the pneumatic pipeline than known passive acoustic methods. Furthermore, it will be particularly appreciated that the present method allows to monitor particulate solids flow in a pneumatic pipeline under very adverse conditions, such as e.g.: high temperatures, very dense and/or inhomogeneous flow regimes and/or very abrasive particulate solids.

The structure-born acoustic waves are normally sensed in one or more specific frequency ranges within the frequency range of 0 to 1000 kHz and subjected to a frequency dependent analysis to derive therefrom a value that is representative of the mass flow rate of the particulate solids flow.

The stemlike impact body can be easily isolated from the pneumatic pipeline with regard to structure-born acoustic noise. Thus, the structure-born acoustic waves that are sensed on the impact body cannot be falsified through structure-born acoustic noise in the pipeline.

The stemlike impact body is advantageously arranged within a measuring chamber that is connected between an upstream section and a downstream section of the pneumatic pipeline. At the inlet of the measuring chamber, a nozzle transforms the particulate solids flow from the upstream section into a free, compact solid/gas jet, which impacts onto the stemlike impact body with substantially its whole cross-section. The particulate solids and the carrier gas that are deflected by the impact body leave the measuring chamber to re-establish a particulate solids flow in the downstream section of the pneumatic pipeline.

To be protected against abrasion, the measuring chamber advantageously has a dead end that fills with particulate solids. In such an embodiment, the impact body has an impact head that is supported by a stem to protrude out of the particulate solids in the dead end.

A preferred device for monitoring the mass flow a particulate solids flow in a pneumatic pipeline comprises a measuring chamber with an inlet connection, an impact body located within the measuring chamber and an acoustic transducer associated with the impact body. The inlet connection is designed to blow the particulate solids flow as a compact solid/gas jet onto the impact body, so that the compact solid/gas jet impacts onto the impact body with substantially its whole cross-section. In accordance with an important aspect of the present invention, the impact body is a stemlike body axially penetrating into the measuring chamber in axial prolongation of the central axis of the inlet connection, so that the compact solid/gas jet impacts onto a frontal impact surface of the stemlike impact body with substantially its whole cross-section, and an acoustic transducer is associated with the impact body outside of the measuring chamber for sensing structure-born acoustic waves generated by the compact solid/gas jet impacting onto the impact body and for converting the sensed signals in an output signal. It will be particularly appreciated that the present device allows to reliably monitor particulate solids flow in a pneumatic pipeline under very adverse conditions, such as e.g.: high temperatures, very dense and/or inhomogeneous flow regimes and/or very abrasive particulate solids.

Signal processing means are normally connected to the acoustic transducer for processing the output signal of the latter, so as to derive therefrom a measure of the mass flow rate of the particulate solids flow.

A preferred embodiment of the impact body includes a mounting plate for mounting the impact body into the measuring chamber, a support stem centrally supported on the mounting plate and an impact head supported by the support stem. This impact head forms an impact surface in axial prolongation of a central axis of the inlet connection. In a first embodiment, the impact head forms an impact surface that is substantially flat and perpendicular to the central axis of the inlet connection. In a preferred embodiment, the impact head forms a convex, conical impact surface that is coaxial to the central axis of the inlet connection. The mounting plate closes the measuring chamber axially opposite the inlet connection, and the measuring chamber has an outlet opening laterally of the impact body. The inlet connection advantageous includes a nozzle for producing the compact solid/gas jet.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
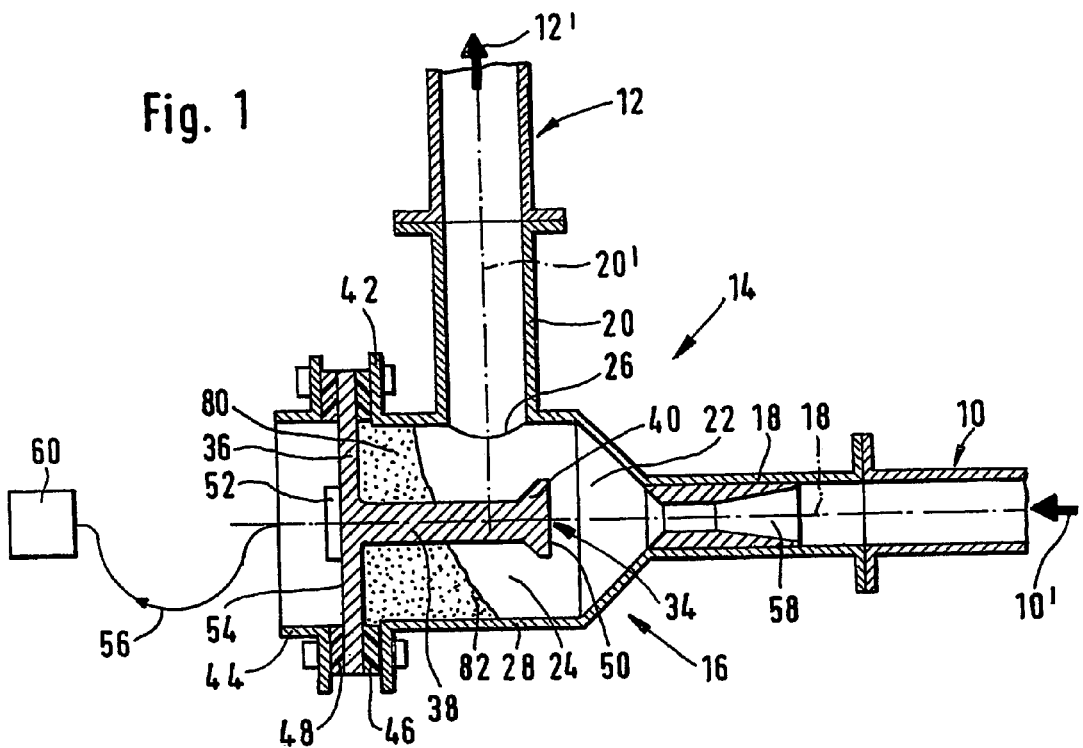
FIG. 1: is a schematic section through a device in accordance with the present invention, for monitoring the mass flow of a particulate solids flow in a pneumatic pipeline.

In FIG. 1, reference number 10 identifies an upstream section and reference number 12 a downstream section of a pneumatic pipeline. Such a pneumatic pipeline is used to convey particulate materials, as e.g. pulverized or granular materials, using a gaseous fluid, usually air or an inert gas, as carrier medium. Such a particulate solids flow is schematically identified by arrow 10', respectively 12'.

Reference number 14 globally identifies a device for monitoring the mass low a particulate solids flow in the pneumatic pipeline 10', 12'. This device 14 is connected between the upstream section 10 and the downstream section 12 of the pneumatic pipeline in replacement of a pipeline bend. It comprises a measuring chamber 16 with an inlet connection 18 and an outlet connection 20. The central axes 18' and 20' of the inlet connection 18 and the outlet connection 20 are perpendicular to each other. The upstream section 10 of the pneumatic pipeline is axially connected to the inlet connection 18, and the downstream section 12 is axially connected to the outlet connection 20 of the measuring chamber 16. The inlet connection 18 axially opens into a conically diverging inlet chamber 22, which forms a transition into a cylindrical chamber 24 of the measuring chamber 16. This cylindrical chamber is coaxial to the central axis 18' of the inlet connection and has a much bigger free cross-section than the latter. The outlet connection 20 has an inlet opening 26 in a peripheral wall 28 of the cylindrical chamber 24.

Reference number 34 globally identifies an impact body, which includes a disk shaped mounting plate 36, a support stem 38 centrally supported on the mounting plate 36, and an impact head 40 supported by the support stem 38. The disk shaped mounting plate 36 is flanged with the help of an auxiliary flange 44 onto a flange 42 of the measuring chamber 16, so that it closes the latter axially opposite the inlet connection 18. Two damping rings 46, 48, which are made of a material having a good damping efficiency with regard to structure-born acoustic waves, isolate the mounting plate 36 (and consequently the impact body 34) from the measuring chamber 16 (and consequently from the pneumatic pipeline sections 10, 12), with regard to the transmission of structure-born acoustic noise.

The support stem 38 axially extends through the measuring chamber 16, to support the impact head 40 at the inlet of the cylindrical chamber 24 in axial prolongation of the central axis 18' of the inlet connection 18. In FIG. 1, the impact head 40 forms an impact surface 50, which is substantially flat and perpendicular to the central axis of the inlet connection 18.

A converging nozzle 52 is included in the inlet connection 18 to transform the particulate solids flow 10' in the upstream section 10 of the pneumatic pipeline in a compact solid/gas jet (not shown) that is axially blown into the measuring chamber 16 onto the impact surface 50. It will be noted that the impact surface 50 is big enough to warrant that the compact solid/gas jet impacts onto this surface 50 with its whole cross-section.

The solid particles impacting onto the impact surface 50 generate structure-born acoustic waves in the impact body 34, which are measured by an acoustic transducer 52. The latter is in direct contact with an outer surface 54 of the mounting plate 36 of the impact body 34, in axial alignment with the support stem 38. As the impact body 34 is isolated from all other equipment with regard to structure-born acoustic noise, the acoustic transducer 52 only senses the structure-born acoustic waves which are generated by the compact solid/gas jet impacting with its whole cross-section onto the impact surface 50. These structure-born acoustic waves are then converted in an output signal 56 to be further processed and monitored. Depending on the characteristics of the particulate solids flow 10' to be monitored, the acoustic transducer 52 should allow a frequency analysis of the structure-born acoustic waves in the frequency range up to 1000 kHz. In some applications, it can be of interest to equip the impact body 34 with several acoustic transducers, each of these transducers being optimized for a particular frequency range.

Reference number 60 identifies a schematically represented signal processing equipment, to which the acoustic transducer 52 is connected. Such a signal processing equipment 60 comprises e.g. a computer, which processes the output signal 56 of the acoustic transducer 52 in real time. Special software filters and transforms the digitized output signal of the acoustic transducer 52 to derive therefrom a measure of the mass flow rate of the particulate solids flow. It will indeed be noted that the frequency and the amplitude of the structure-born acoustic waves sensed by the acoustic transducer 52 are representative of the number of impacts during a unit of time and of the mass of these particles, i.e. in other words of the mass flow rate of the particulate solids flow.

Referring again to the measuring chamber 16, it will be noted that the particles impacting onto the impact surface 50 will be deflected back into the measuring chamber 16. They will leave this measuring chamber 16 through the outlet connection 20, to form the particulate solids flow 12' in the downstream section 12 of the pneumatic pipeline.

The measuring chamber 16 has a dead end 80 downstream of the inlet opening 26 of the outlet connection 20. This dead end 80 is filled up with the particulate material as schematically indicated by the dotted surface 82. It will be appreciated that the material accumulated in this dead end 80 helps to protect the measuring chamber 16 against abrasion.

Figure 2:
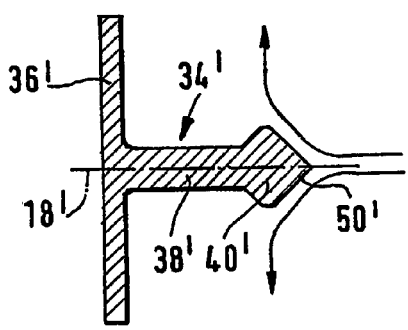
FIG. 2: is section through an alternative embodiment of an impact body for the device of FIG. 1.

FIG. 2 represents an alternative embodiment of an impact body. This impact body 34' distinguishes from the impact body 34 of FIG. 1 mainly in that the impact head 40' forms a convex, conical impact surface 50' that is coaxial to the central axis 18' of the inlet connection 18. This conical impact surface 50' radially deflects the solid particles impacting thereon. Such a radial deflection has the advantage that the deflected particles interfere to a lesser degree with the solid/gas jet before the latter impacts onto the impact surface 50'. In other words, the compact solid/gas jet remains more compact and homogeneous than with the impact head 34 and less solid particles are prevented from impacting onto the impact surface 50'.

What is claimed is:

1. A device for monitoring the mass flow of a particulate solids flow in a pneumatic pipeline, comprising:
    a measuring chamber;
    an impact body within said measuring chamber; and
    an inlet connection designed so as to blow said particulate solids flow as a compact solid/gas jet onto said impact body within said measuring chamber, so that said compact solid/gas jet impacts onto said impact body with substantially its whole cross-section, said inlet connection having a central axis; wherein said impact body is a stemlike body penetrating into said measuring chamber in axial prolongation of said central axis of said inlet connection, so that said compact solid/gas jet impacts onto a frontal impact surface of said impact body with substantially its whole cross-section; and
    an acoustic transducer associated with said impact body outside of said measuring chamber for sensing structure-born acoustic waves generated by said compact solid/gas jet impacting onto said impact body, and for converting them in an output signal for monitoring the mass flow of a particulate solids in a pneumatic pipeline.

2. The device as claimed in claim 1, further including: signal processing means for processing said output signal so as to derive therefrom a value that is representative of the mass flow rate of the particulate solids flow.

3. The device as claimed in claim 1, wherein said stemlike impact body is isolated from said measuring chamber with regard to structure-born acoustic waves.

4. The device as claimed in claim 1, wherein said stemlike impact body includes:
    a mounting plate for mounting said impact body in said measuring chamber;
    a support stem centrally supported on said mounting plate; and
    an impact head supported by said support stem, said impact head forming said impact surface in axial prolongation of a central axis of said inlet connection.

5. The device as claimed in claim 4, wherein said impad surface is substantially flat and perpendicular to the central axis of said inlet connection.

6. The device as claimed in claim 4, wherein said impact surface is a conical surface that is coaxial to the central axis of said inlet connection.

7. The device as claimed in claim 4, wherein: said mounting plate closes said measuring chamber axially opposite said inlet connection; and said measuring chamber has a lateral outlet opening laterally of said impact head.

8. The device as claimed in claim 7, wherein said measuring chamber has a dead end extending axially downstream of said lateral outlet opening.

9. A device for monitoring the mass flow of a particulate solids flow in a pneumatic pipeline comprising:
    means for transforming said particulate solids flow into a free and compact solid/gas jet;
    a stemlike impact body for intercepting said compact solid/gas jet, said stemlike impact body being axially arranged in said compact solid/gas jet so that the latter impacts onto a frontal impact surface of said impact body with substantially its whole cross-section; and
    a sensing means for sensing structure-born acoustic waves which are generated in said impact body by said compad solid/gas jet impacting thereon for monitoring the mass flow of a particulate solids in a pneumatic pipeline.

10. The device as claimed in claim 9, wherein said stemlike impact body is isolated from said pneumatic pipeline with regard to structure-born acoustic noise.

11. The device as claimed in claim 9, further comprising:
a measuring chamber that is connected between an upstream section and a downstream section of said pneumatic pipeline, wherein said stemlike impact body is arranged within said measuring chamber.

12. The device as claimed in claim 11, wherein said means for transforming said particulate solids flow into a free and compact solid/gas jet comprises a nozzle connected to said upstream section and capable of transforming a particulate solids flow from said upstream section into a free, compact solid/gas jet, which axially impacts onto said impact body with substantially its whole cross-section.

13. The device as claimed in claim 12, wherein said measuring chamber includes at least one lateral outlet opening arranged laterally of said impact body.

14. The device as claimed in claim 13, wherein:
    said stemlike impact body has an impact head;
    said at least one lateral outlet opening is arranged laterally of said impact head;
    said measuring chamber has a dead end that is filled up with particulate solids downstream of said lateral outlet opening; and
    said impact head is supported by a stem so as to protrude out of said particulate solids in said dead end.

* * * * *

UNITED STATES PATENT AND TRADEMARK OFFICE
CERTIFICATE OF CORRECTION

PATENT NO. : 6,988,857 B2
DATED : January 24, 2006
INVENTOR(S) : Yvan Kroemmer and Emile Breden It is certified that error appears in the above-identified patent and that said Letters Patent is hereby corrected as shown below:

Column 6,
Line 60, "impad" should read -- impact --.

Column 7,
Line 17, "compad" should read -- compact --.

Signed and Sealed this

Eighteenth Day of April, 2006

JON W. DUDAS
*Director of the United States Patent and Trademark Office*